(12) United States Patent
Pettitt

(10) Patent No.: US 7,570,410 B2
(45) Date of Patent: Aug. 4, 2009

(54) HIGH BRIGHTNESS DISPLAY SYSTEMS USING MULTIPLE SPATIAL LIGHT MODULATORS

(75) Inventor: Gregory S. Pettitt, Farmersville, TX (US)

(73) Assignee: Texas Instruments Incorporated, Dallas, TX (US)

( * ) Notice: Subject to any disclaimer, the term of this patent is extended or adjusted under 35 U.S.C. 154(b) by 171 days.

(21) Appl. No.: 11/617,190

(22) Filed: Dec. 28, 2006

(65) Prior Publication Data

US 2008/0158516 A1 Jul. 3, 2008

(51) Int. Cl.
*G02F 1/00* (2006.01)
*G02B 26/08* (2006.01)
(52) U.S. Cl. .................................. 359/237; 359/298
(58) Field of Classification Search ......... 359/290–292, 359/295, 223–225, 245, 260–263, 298, 198, 359/301–303, 317–318, 237, 242
See application file for complete search history.

(56) References Cited

U.S. PATENT DOCUMENTS

| 5,612,753 | A | | 3/1997 | Poradish |
| 5,921,650 | A | * | 7/1999 | Doany et al. .................. 353/31 |
| 2007/0102637 | A1 | * | 5/2007 | Chang et al. ............. 250/338.1 |

FOREIGN PATENT DOCUMENTS

JP 11-264953 A 9/1999

* cited by examiner

*Primary Examiner*—Scott J Sugarman
*Assistant Examiner*—Dawayne A Pinkney
(74) *Attorney, Agent, or Firm*—Wade James Brady, III; Frederick J. Telecky, Jr.

(57) ABSTRACT

The display system separates reflected and transmitted light from a color wheel of the display system; and modulates the separated reflected and transmitted light components using separate spatial light modulators so as to achieve high brightness.

5 Claims, 7 Drawing Sheets

HIGH BRIGHTNESS DISPLAY SYSTEMS USING MULTIPLE SPATIAL LIGHT MODULATORS

TECHNICAL FIELD

The technical field of the examples to be disclosed in the following sections relates to the art of display systems, and more particularly, to the field of display systems employing spatial light modulators.

BACKGROUND

Color wheels are widely used in display systems employing spatial light modulators, such as display systems using DMD®. To achieve high lumens and/or brightness, the color wheels often have white segments. With the ever increasing growth of lumens in projectors, the white segments have grown from being in the low 30° degrees range to the 120° degrees range today. This causes the white of the projection system to meet the desired lumens goals, but the secondary (e.g. cyan, yellow, and magenta) and the primary colors (e.g. read, green, and blue) actually get dimmer. Secondary colors suffer when the white is increased without a corresponding increase in their lumen output. This has been addressed through the addition of secondary color segments along with the white segments, but this typically is only one of the secondary colors that are added to the color wheel.

The color wheel systems also are being pushed to operate at higher color refresh rates in order to combat the color breakup problem. These higher color refresh rates further widens the gap between white and the other colors due to more spoke time (or transition time). The higher color refresh rates also reduce the lifetime of the color wheel motor.

SUMMARY

In one example, a method for producing an image is disclosed herein. The method comprises: producing a set of color light beams by illuminating a white light beam through a color wheel, wherein the color wheel transmits and reflects the incident light beam; directing the transmitted and reflected set of color light beams separately to first and second spatial light modulators; modulating the transmitted and reflected set of color light beams separately by the first and second spatial light modulators; and projecting the modulated transmitted and reflected light beams onto a screen for viewing.

In another example, a method for producing an image is disclosed herein. The method comprises: producing a light beam having first and second polarization components; transforming the first polarization component into the second polarization component; directing the transformed light beam onto a color wheel that passes a portion and reflects another portion of the transformed light beam; directing the transmitted and reflected portions of the light beam onto first and second spatial light modulators, further comprising: transforming the reflected component of the light beam into a light beam having the second polarization; modulating the transmitted and reflected light beams with the first and second spatial light modulators separately; and projecting the modulated light onto a screen.

In yet another example, a method of producing an image is disclosed herein. The method comprises: producing a first portion of the image with a first spatial light modulator, wherein the first portion is composed of a first set of colors; producing a second portion of the image with a second spatial light modulator, wherein the second portion is composed of a second set of colors; and superimposing the first and second portions of the image on the screen so as to obtain a desired color.

DETAILED DESCRIPTION OF EXAMPLES

A high brightness display system employing a color wheel and multiple spatial light modulators is disclosed herein. The display system uses both the transmitted and reflected light from the color wheel in producing images. Specifically, the transmitted and reflected light components are sent to separate spatial light modulators and modulated separately.

Figure 1:
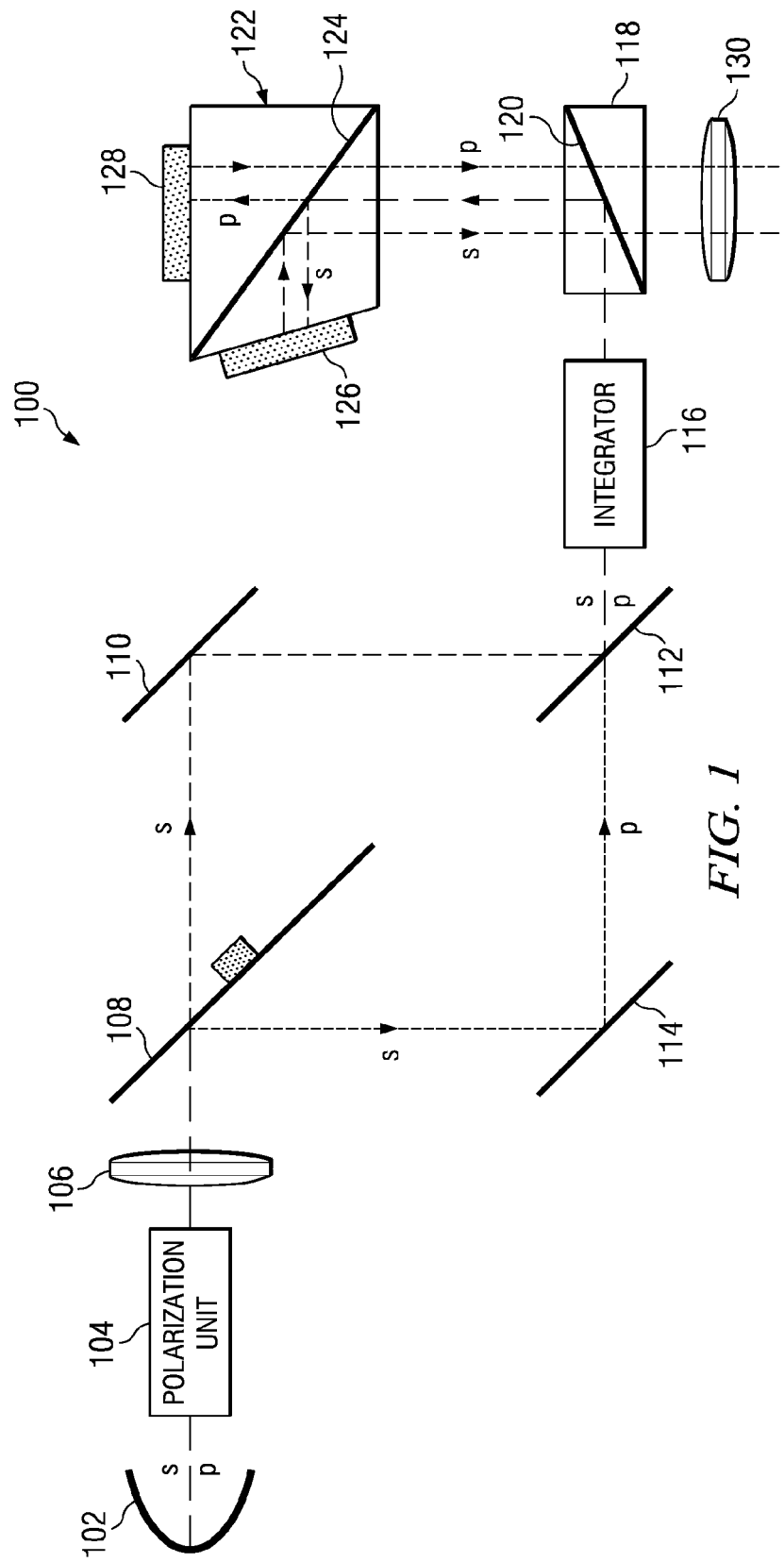
FIG. 1 illustrates a diagram of an exemplary display system employing multiple spatial light modulators.

Referring to FIG. 1, a diagram schematically illustrating an exemplary display system is presented therein. In this particular example, display system 100 comprises light source, polarization unit 104, condensing lens 106, color wheel 108, polarization rotator 114 (i.e. a half-wave plate capable of rotating polarization), filter 112, mirror 110, light integrator 116, optical prism assemblies 118 and 122 (which further comprise a polarization beam splitter), spatial light modulator 126 and 128, and projection optics 130.

The light source, such as an arc lamp, provides illumination light that is composed of s and p polarization components. Polarization unit 104 transforms one of the two components, such as p (or s) as much as possible into the other component, such as s (or p) component. The light is directed to color wheel 108 through condensing lens 106.

The polarization unit 104 can be any suitable devices, such as those described in U.S. Pat. Nos. 6,927,910 and 6,208,451, the subject matter of each being incorporated herein by reference in entirety. The polarization rotator, which is preferably a half-wave plate, is a device that receives a beam of radiation of any arbitrary polarization direction (angle) and produces a new radiation beam, coaxial with the incident radiation but with a specified new polarization direction (angle).

Figure 2:
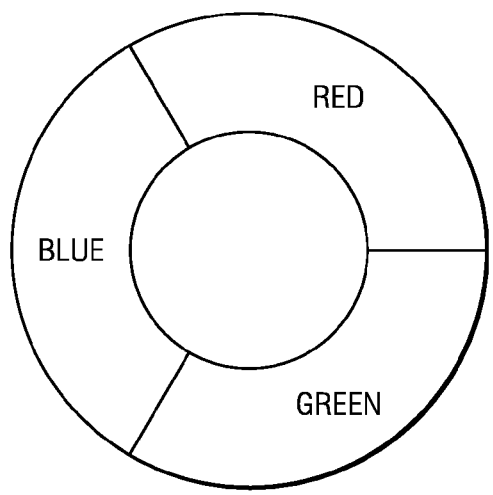
FIG. 2 schematically illustrates an exemplary color wheel that can be used in the display system in FIG. 1.

The color wheel comprises a set of primary colors, such as red, green, and blue as shown in FIG. 2. Alternatively, the color wheel can have other color components, such as cyan, magenta, and yellow. In other examples, the color wheel can have other combinations of colors, selected from red, green, blue, cyan, magenta, yellow, and other colors; and the colors can be arranged in the color wheel in any desired orders. However, it is preferred that the color wheel does not have a white segment.

Referring again to FIG. 1, the color wheel is configured to transmit a majority (e.g. 90% or more, or 95% or more) of the incident light having the major polarization, e.g. s component in the above example, is transmitted through the color wheel and directed onto mirror 110. The portion of the incident light reflected from the surface of the color wheel is directed to polarization rotator 114. The polarization rotator (114) transforms the polarization from one to the other, such as from s to p in the above example. Optical filter 112 transmits the light portion with one of the two polarizations and reflects the light portion with the other one of the two polarizations. With the above example, optical filter transmits p component light and reflects the s component light, as shown in the figure. Both of s and p components light are directed to optical assembly 118 through optional optical integrator 116. The optical assembly (118) comprises reflective surface 120, such as a total internal reflection (TIR) surface, for directing the s and p components onto another optical assembly 122 that comprises a beam splitter 124. At optical assembly 122, the s and p components are respectively directed to separate spatial light modulators 126 and 128 by transmission and reflection. In the particular example as shown in the figure, the s component is reflected by beam splitter 124 to spatial light modulator 126; and the p component is transmitted through beam splitter 124 to spatial light modulator 128. The spatial light modulators then respectively modulate the s and p component light so as to form different color portions of the desired image. The modulated light from the two spatial light modulators are directed to projection lens 130 that is capable of projecting the modulated light onto a screen for displaying.

In the above example, it can be seen that the color wheel reflects and transmits the incident illumination light. The transmitted and reflected light portions after the color wheel are delivered to separate spatial light modulators for modulation. Because the transmitted and reflected light portions can have different color combinations, the desired color of the projected image on the screen can be achieved. The above light recapture process is superior over those existing light recapture processes using polarization beam splitters in the same field, wherein a polarization beam splitter simply rejects one of the polarizations resulting in a loss of light.

As a way of example, the color wheel comprises red, green, and blue segment (in the absence of a white segment), the transmitted light portion is composed of red, green, and blue colors; whereas the cyan, magenta, and yellow (which is often referred to as the secondary colors) color portions of the incident light are reflected by the color wheel. The red, green, and blue colors are delivered to spatial light modulator 122 for modulation; while the cyan, magenta, and yellow colors are delivered to spatial light modulator 128 for modulation. The modulated light of different sets of colors (red, green, blue from spatial light modulator 126; and cyan, magenta, and yellow from spatial light modulator 128) are projected onto the screen and are superimposed onto each other so as to generate the image with desired colors.

The spatial light modulators in the above example as discussed with reference to FIG. 1 are preferably spatial light modulators each comprising an array of individually addressable micromirrors, though the two spatial light modulators may or may not have the same configuration. For example, the micromirror arrays of the two spatial light modulators may have different resolutions with the resolution being defined as the total number of micromirrors in the array used in modulating the incident light. In another example, each or both of the spatial light modulators can be spatial light modulators of other suitable pixels, such as liquid-crystal cells, liquid-crystal-on-silicon cells, and other suitable devices. When a transmissive LCD panel is used, such transmissive LCD panel can be placed in the earlier parts of the light bundle, i.e. before the optical component which reflects s polarization and transmits p polarization. The optical integrator and the other optical prism assemblies can be accordingly replaced by components which put the polarized light back onto one beam and then through the projection lens.

Figure 3:
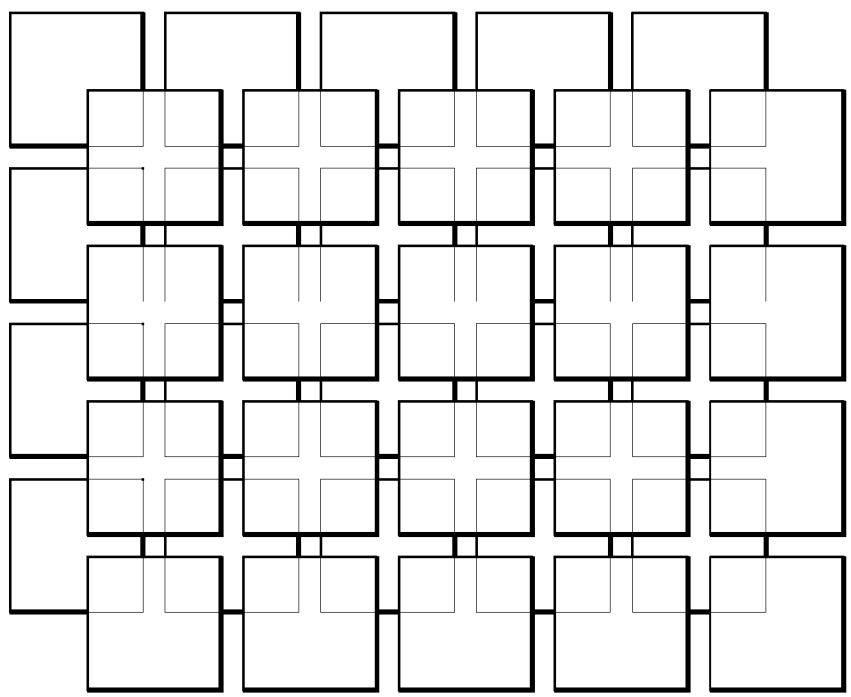
FIG. 3 demonstrates a method of producing images at a perceived resolution higher than the resolution of the spatial light modulator.

Because the display system employs multiple spatial light modulators each having an array of pixels, image resolutions higher than either one of the two spatial light modulators can be achieved using the system configuration as shown in FIG. 1, wherein the two spatial light modulators are juxtaposed and modulate the incident light in parallel. For example, the color wheel can be configured to have 6 multi-primary colors—red, green, blue, cyan, magenta, and yellow with each color being an independent color image channel. Using a ASIC with, for example, BrilliantColor™ circuit which supporting multiple color channels or other algorithms supporting the combination of more than 3 color channels and gamut mapping, two sets of images formed by different spatial light modulators can be superimposed on the screen, as shown in FIG. 3. Each set of images can be formed by all 6 multi-primary colors. Specifically, one set of images formed by one of the two spatial light modulators can be composed of red, green, blue colors; and the reflected cyan, magenta, and yellow colors. The other one set of images formed by the other spatial light modulator can be composed of the reflected cyan, magenta, and yellow colors, and the transmitted red, green, blue colors. This arises from the fact that both spatial light modulators see all 6 colors. By offsetting the two sets of images formed by the two spatial light modulators a predetermined distance, such as half the pitch size of the array, an image with a higher resolution can be achieved, wherein the pitch size is defined as the center-to-center distance between adjacent pixels of the pixel array of the spatial light modulator. Of course, the offset of the two superimposed images can be of any other values, such as half the diagonal of the pixel size, and other desired values.

The display system has many advantages over the existing display systems. For example, the display can use 2 DDP3021 ASCIC circuit boards and BrilliantColor™ II to define the colors shown by the system. The color system can be fully programmable, which allows for a variety of brightness settings, which in turn, enables the brightness of white can be set to the desired color saturation, such as 100% white, with 70% or 60% with yellow, cyan, and magenta staying the same. The display system disclosed herein further allows for the entire timeline in image projection being used to make the secondary colors, i.e. the combination of red, green, and the reflected yellow colors; the combination of red, blue, and the reflected magenta; and the combination of green, blue, and the reflected cyan, which will be discussed afterwards with reference to FIG. 8 to FIG. 11. The display system disclosed herein also enables the color wheel of the display system to have red, green, and blue color only; and be rotated at a double speed at which the color wheels of most existing display systems are spinning. The faster and red, green, and blue color only color wheel, in turn, produces fewer artifacts caused by pulse-width-modulation techniques as compared to existing display systems—resulting in better noise performance and motion rendition.

In the following, advantages of the display system are better demonstrated through comparisons of the color space, brightness, colorfulness, lumen ratio, and white efficiency of to those specification parameters of other commercially available display systems.

In the following comparisons, each project system design maintains the same color gamut, and approximates the same white point with the color temperature maintained in the 7000 to 7500 region. For color ratio comparisons, the monitor and 3LCD peak white is made to match that of each 1 chip DLP® display system.

The color efficiency and color to white ratios are listed in Table 1.

TABLE 1

|         | Efficiency | Ratio to white |
|---------|------------|----------------|
| Red     | 0.2126     | 21%            |
| Green   | 0.7152     | 72%            |
| Blue    | 0.0722     | 7%             |
| Yellow  | 0.9278     | 93%            |
| Magenta | 0.2848     | 28%            |
| Cyan    | 0.7874     | 79%            |
| White   | 1.00       |                |

The color efficiency and color to white ratios are listed in Table 2.

TABLE 2

|         | Efficiency | Ratio to white | Compare to Rec.709 |
|---------|------------|----------------|--------------------|
| Red     | 0.1768     | 18%            | 83%                |
| Green   | 0.7668     | 77%            | 107%               |
| Blue    | 0.0622     | 6%             | 86%                |
| Yellow  | 0.9291     | 93%            | 100%               |
| Magenta | 0.2391     | 24%            | 84%                |
| Cyan    | 0.8686     | 87%            | 110%               |
| White   | 1.00       |                |                    |

The color efficiency and color to white ratios are listed in Table 3.

TABLE 3

|         | Efficiency | Ratio to white | Compare to Rec.709 | Compare to 3 LCD |
|---------|------------|----------------|--------------------|------------------|
| Red     | 0.1485     | 15%            | 70%                | 84%              |
| Green   | 0.6037     | 60%            | 84%                | 79%              |
| Blue    | 0.0596     | 6%             | 83%                | 96%              |
| Yellow  | 0.8375     | 84%            | 90%                | 90%              |
| Magenta | 0.2339     | 23%            | 82%                | 98%              |
| Cyan    | 0.7398     | 74%            | 94%                | 85%              |
| White   | 1.00       |                |                    |                  |

Notations of display systems in FIG. 4 to FIG. 7 are listed below:

RGBRGB—DLP® 1 chip color wheel system using a six segment color wheel (red, green, blue, red, green, and blue segments)

RYGCBM 1 Chip—DLP® 1 chip color wheel system using a six segment color wheel with RGB and secondary color segments (CMY)

RGB 2 Chip—DLP® 2 chip projector which used one DMD to alternate between green and blue. The second DMD always shows red.

RGW(85)B 1 Chip—DLP® 1 chip color wheel system using a 4 segment color wheel with an 85 degree white segment RYGXB 1 Chip—DLP® 1 chip color wheel system using a 5 segment color wheel using a yellow segment and a bluish-white segment ()

RGW(100)B 1 Chip—DLP® 1 chip color wheel system using a 4 segment color wheel with an 100 degree white segment RGB SCR—Sequential Color Recapture (SCR) using an RGB color wheel RGYB SCR—Sequential Color Recapture (SCR) using an RGYB color wheel with a yellow segment for increased brightness RGB (C'M'Y')2 Chip (68% W)—DLP® 2 chip projector using polarization with an RGB color-wheel (CMY light reflected). The full-on white of the projection system does not used the maximum attainable white of the system, but rather only shows 68% of the possible full on white. This allows for a more colorful system.

Rec 709—Standard CRT monitor

3LCD—Standard 3 chip HTPS LCD projector

RGWB SCR—Sequential Color Recapture (SCR) using an RGWB color wheel for increased brightness.

RGB (C'M'Y')2 Chip (77% W)—DLP® 2 chip projector using polarization with an RGB color-wheel (CMY light reflected). The full-on white of the projection system does not used the maximum attainable white of the system, but rather only shows 77% of the possible full on white. This allows for a more colorful system.

RGB (C'M'Y')2 Chip (100% W)—DLP® 2 chip projector using polarization with an RGB color-wheel (CMY light reflected). The full-on white of the projection system uses the maximum attainable white of the system.

Figure 4:
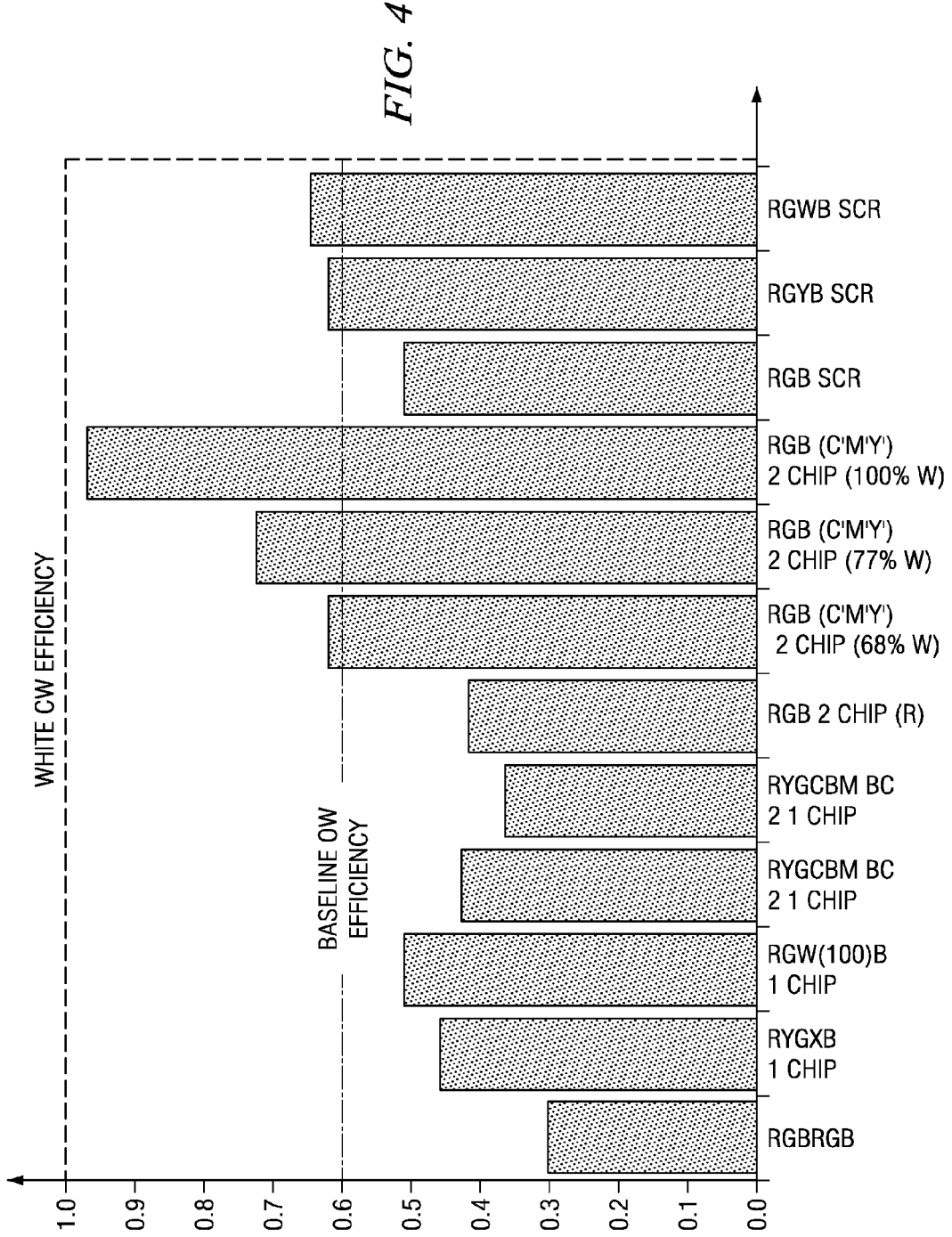
FIG. 4 shows a diagram comparing the white color wheel efficiency of multiple display systems using spatial light modulators.

FIG. 4 is a diagram showing the white color wheel efficiency of selected display systems currently available in the market. As can be seen in the figure, a display system having a color wheel that comprises red, green, and blue segments and two spatial light modulators can achieve the white color wheel efficiency of 68% (represented by the bar of RGB (C'M'Y') 2 chip (68% white)), 77%(represented by the bar of RGB(C'M'Y') 2 chip (77% white)); and even 100% (represented by the bar of RGB(C'M'Y') 2 chip (100% white)), which are higher than that in other display systems shown in the figure.

Figure 5:
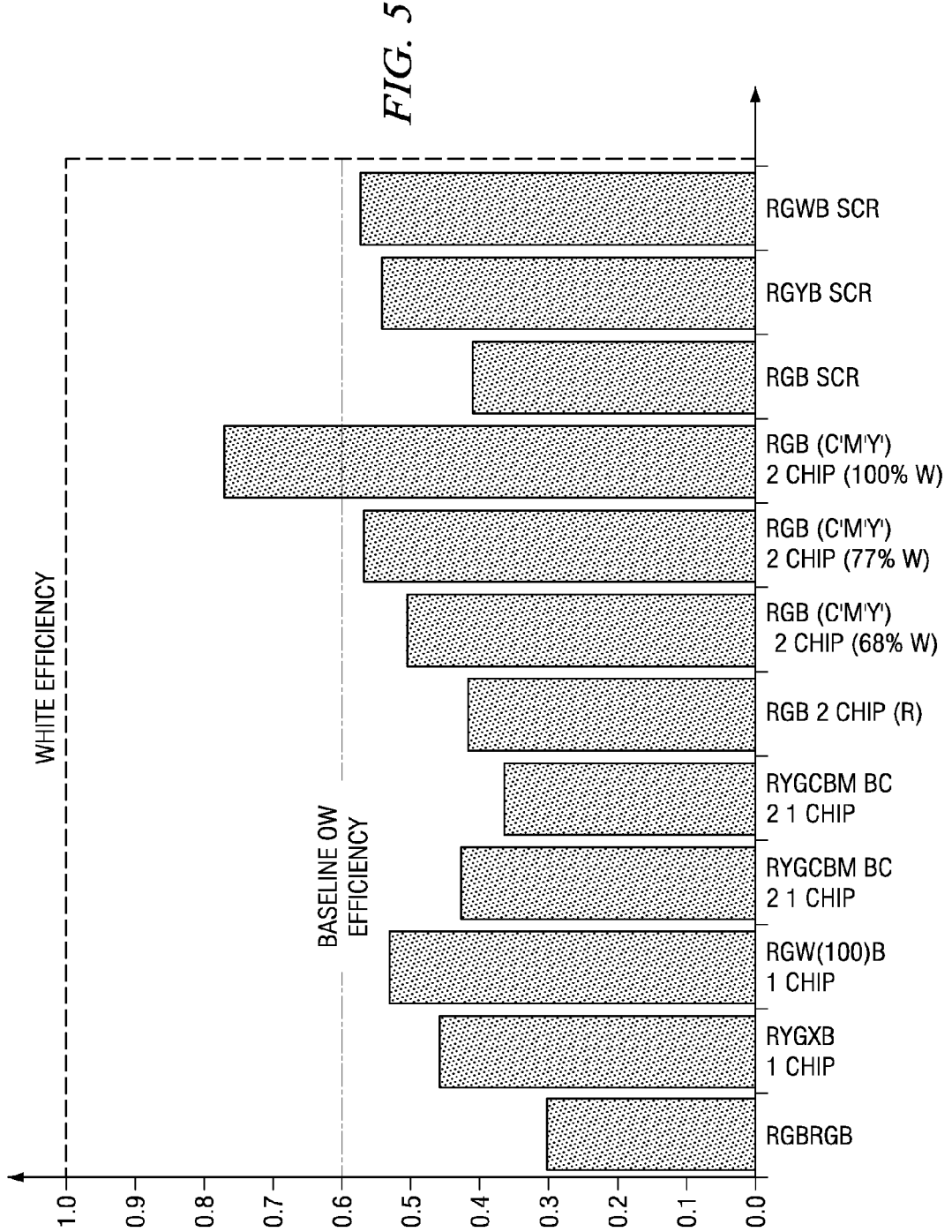
FIG. 5 shows a diagram comparing the white brightness of multiple display systems using spatial light modulators.

In the white brightness comparison plot as shown in FIG. 5, a display system having a color wheel that comprises red, green, and blue segments and two spatial light modulators can achieve white brightness more than 50% (represented by the bar of RGB(C'M'Y') 2 chip (60% white)), more than 57% (represented by the bar of RGB(C'M'Y') 2 chip (77% white)); and more than 75% (represented by the bar of RGB(C'M'Y') 2 chip (100% white)), which are higher than that in other display systems shown in the figure.

Figure 6:
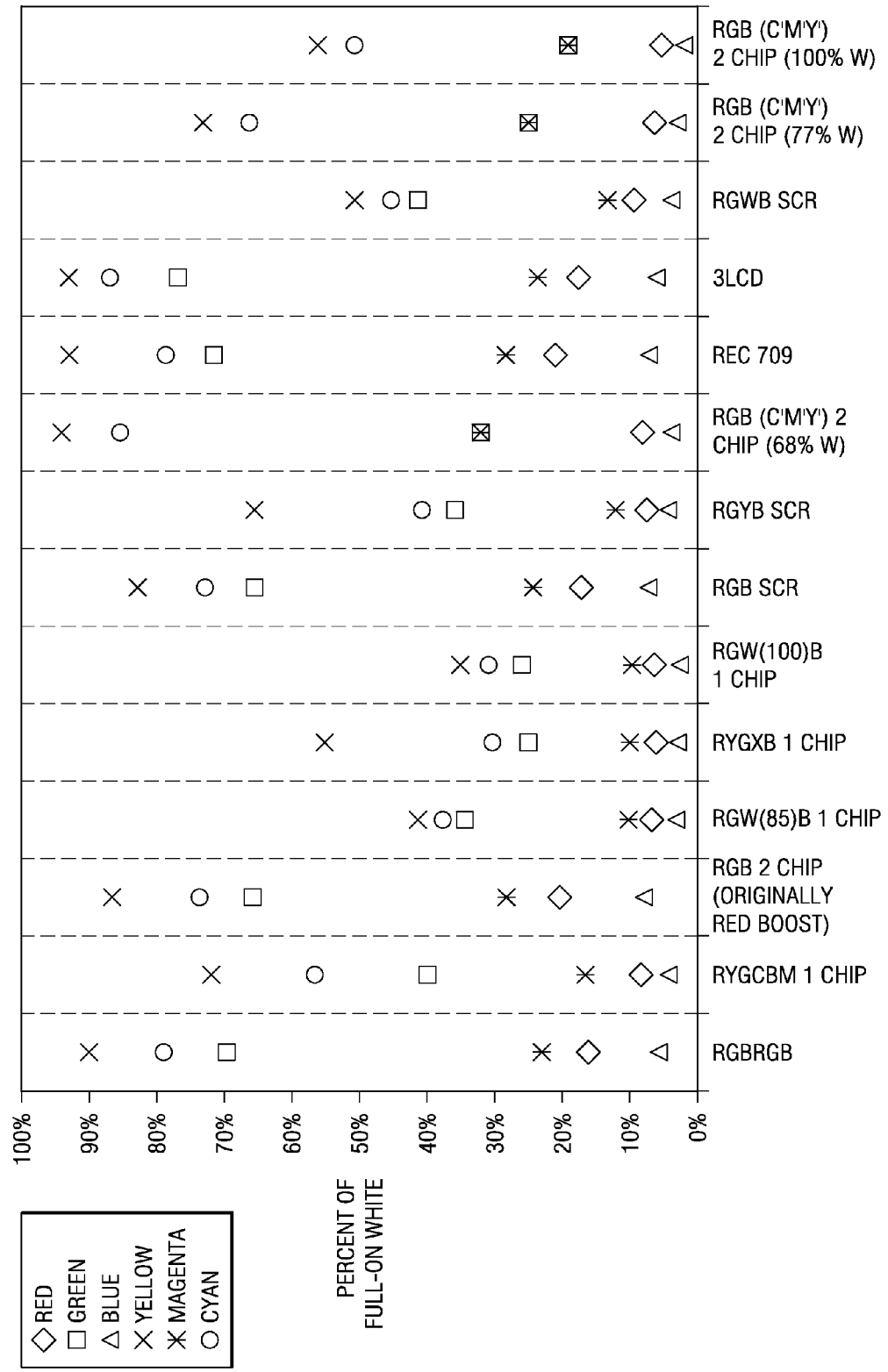
FIG. 6 and FIG. 7 show diagrams comparing the color to white ratio of multiple display systems using spatial light modulators.
Figure 7:
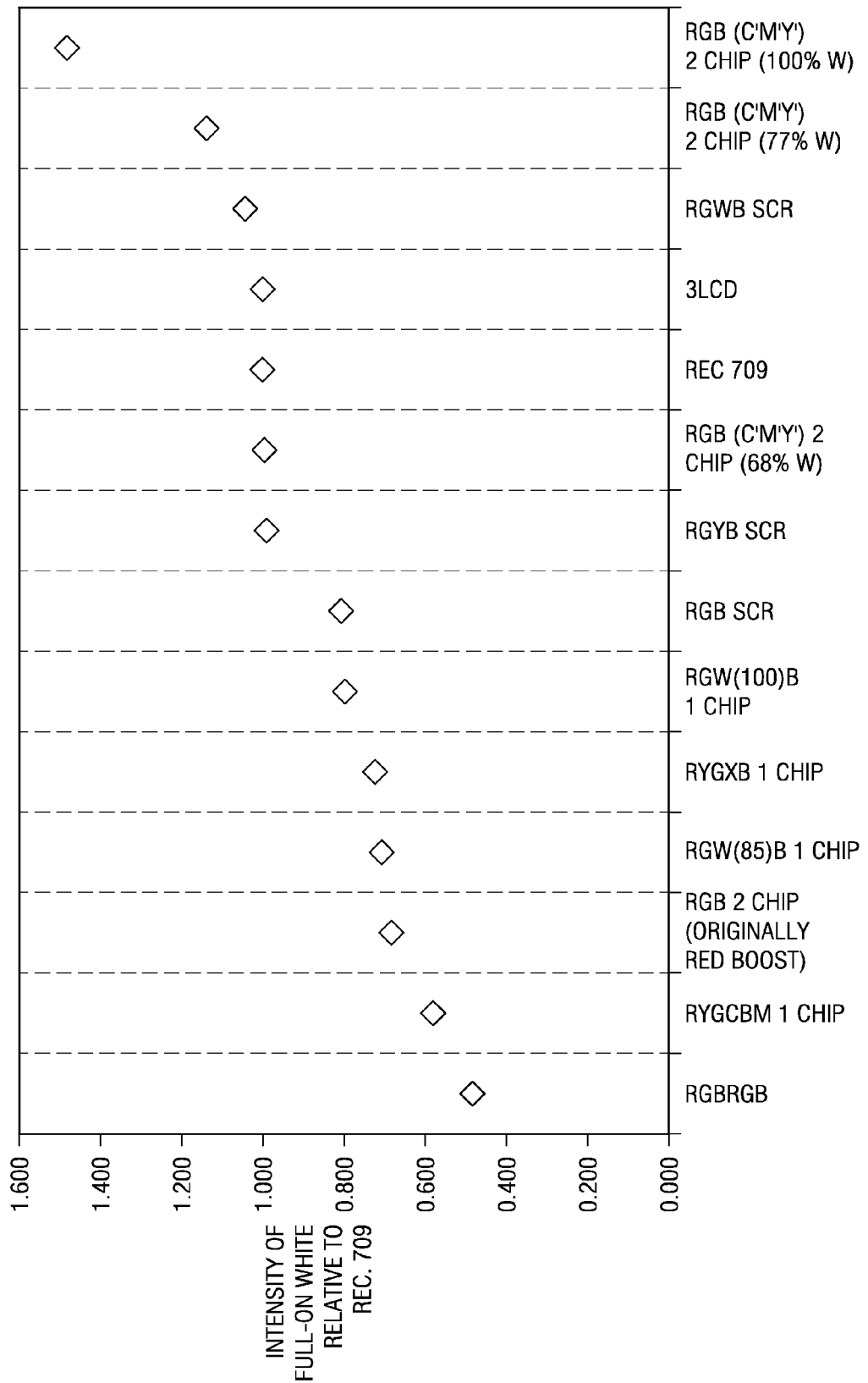

FIG. 6 presents color to white percentages in different display systems; and FIG. 7 shows intensity of full-on white relative to Rec. 709 for a variety of existing display systems. It can be seen in the figure that the intensity of full-on white relative to Rec. 709 monotonically increases from RGBRGB system to RGB (C'M'Y') 2 chip (100% white) with RGB (C'M'Y') 2 chip (77% white) and RGB (C'M'Y') 2 chip (100% white) display systems at the high end.

Figure 8:
FIG. 8 through FIG. 11 schematically illustrate timeline for presenting different primary and secondary colors.
Figure 9:
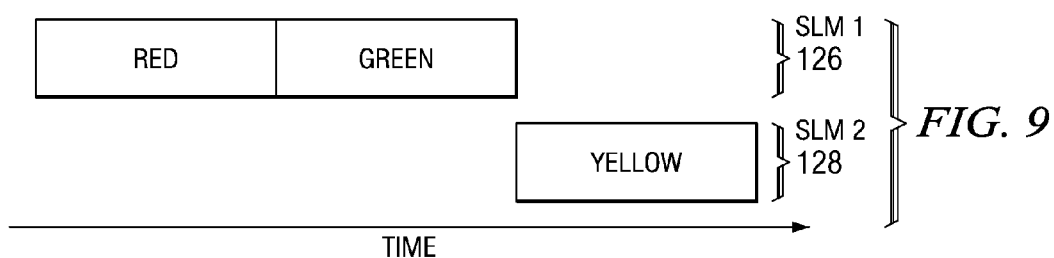
Figure 10:
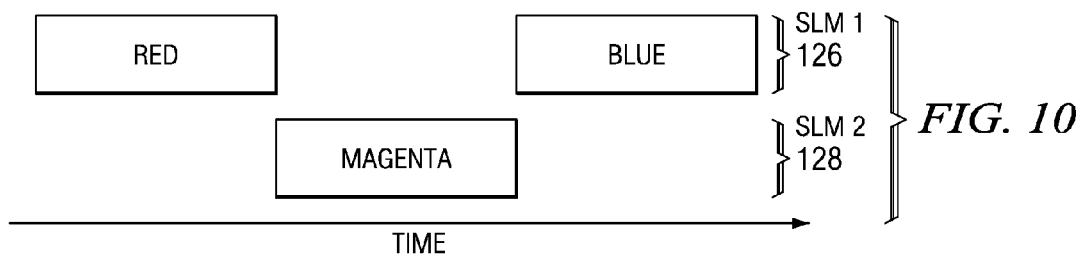
Figure 11:
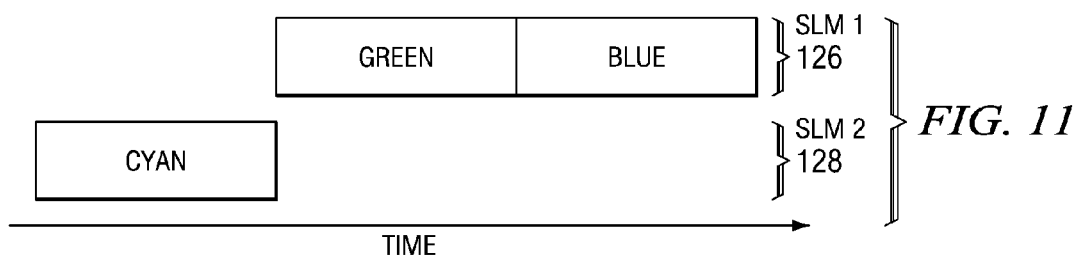

As discussed above, the display systems disclosed herein allow for the entire timeline in image projection to be used to make the secondary colors, i.e. the combination of red, green, and the reflected yellow colors; the combination of red, blue, and the reflected magenta; and the combination of green, blue, and the reflected cyan, as schematically illustrated in FIG. 8 to FIG. 11. Referring to FIG. 8, SLM 1 and SLM 2 respectively receive red, green, and blue, and cyan, magenta, and yellow colors so as to present full-on white. To show yellow color, SLM 1 sequentially receives red and green followed by the SLM 2 receiving yellow color as shown in FIG. 9. Magenta color can be shown by sequentially illuminating SLM 1 with red followed by illuminating SLM 2 with magenta that is followed by illuminating SLM 1 with blue as shown in FIG. 10. Cyan can be shown by sequentially illuminating SLM 2 with cyan followed by sequentially illuminating SLM 1 with green and blue as shown in FIG. 11.

It will be appreciated by those of skill in the art that a new and useful high brightness display system using multiple spatial light modulators have been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

I claim:

1. A method of producing an image, comprising:
   producing a first portion of the image with a first spatial light modulator, wherein the first portion is composed of a first set of colors;
   producing a second portion of the image with a second spatial light modulator, wherein the second portion is composed of a second set of colors, wherein the first and second portions of the image are produced with a first light beam with a first polarization and a second light beam with a second polarization, the first and second polarizations produced by:
   generating a light beam with substantially the first polarization; and
   directing said light beam onto a color wheel that transmits a portion of said light beam and reflects another portion of said light beam, wherein the reflected light beam has the second polarization and wherein the transmitted portion of the light comprises the first set of colors and the reflected portion of the light comprises the second set of colors; and
   superimposing the first and second portions of the image on a the-screen so as to obtain a desired colored image.

2. The method of claim 1, wherein the first set of colors comprises: red, green, and blue.

3. The method of claim 1, wherein the second set of colors comprises: cyan, magenta and yellow.

4. The method of claim 1, wherein the first and second portions of the image are offset a predetermined distance on the screen such that the produced image on the screen has a resolution higher than a resolution of any one of the two spatial light modulators.

5. The method of claim 1, wherein the first spatial light modulator comprises an array of individually addressable micromirrors, LCD cells, or LCOS cells; or the second spatial light modulator comprises an array of individually addressable micromirrors, LCD cells, or LCOS cells.

* * * * *